United States Patent Office 3,836,596
Patented Sept. 17, 1974

3,836,596
POLYMERIZATION OF DIALKYL VINYLIDENE COMPOUNDS TO OILS
Gary L. Driscoll, Boothwyn, Pa., assignor to Sun Research and Development Co., Philadelphia, Pa.
No Drawing. Continuation-in-part of application Ser. No. 134,095, Apr. 14, 1971, which is a continuation-in-part of application Ser. No. 52,771, July 6, 1970, both now abandoned. This application May 1, 1972, Ser. No. 248,982
Int. Cl. C07c 3/18
U.S. Cl. 260—683.15 B    10 Claims

ABSTRACT OF THE DISCLOSURE

Polymerization of olefins of the formula $$CH_2=\underset{R'}{\overset{R}{C}}$$

wherein —R is selected from the class consisting of —$CH_3$ and —$C_2H_5$ and —R' is an alkyl group of from 1 to 10 carbon atoms, to form oils having a relatively high viscosity index as compared to other comparable oils using stannic chloride as the catalyst and a solvent selected from the class consisting of nitromethane, nitroethane and mixtures thereof together and with nitropropane, at from —30 to 100° C. and preferably from —30° to 50° C. The stannic chloride is present in from 0.1 to 5 and preferably 0.3 to 3 volume percent as based on the solvent present.

CROSS REFERENCES TO RELATED APPLICATIONS

This application is a continuation-in-part of U.S. application Ser. No. 134,095, entitled "Polymerization of Dialkyl Vinylidene Compounds to Oils," filed Apr. 14, 1971 by Gary L. Driscoll which in turn is a continuation-in-part of U.S. application Ser. No. 52,771, entitled "Polymerization of Dialkyl Vinylidene Compounds to Oils," filed July 6, 1970 by Gary L. Driscoll, both now abandoned.

This application is related to U.S. application Ser. No. 52,772, entitled "Preparation of Oils From Isobutene," filed July 6, 1970 by Gary L. Driscoll, now U.S. Pat. No. 3,655,808, issued Apr. 11, 1972; U.S. application Ser. No. 52,773, entitled "Oligomerization of Isobutene and α-Methylstyrene," filed July 6, 1970 by Gary L. Driscoll and David L. Kerr, now U.S. Pat. No. 3,657,369, issued Apr. 18, 1972; U.S. application Ser. No. 150,740, entitled "Phosphorous Compound Promoted Oligomerization of Isobutene," filed June 7, 1971 by Gary L. Driscoll now U.S. Pat. No. 3,707,582 issued Dec. 26, 1972, which in turn is a continuation-in-part of U.S. application Ser. No. 53,268, entitled "Phosphorous Compound Promoted Oligomerization of Isobutene," filed July 6, 1970 by Gary L. Driscoll, and now abandoned; and U.S. application Ser. No. 52,300, entitled "Branched Hydrocarbons in the $C_{16}$–$C_{40}$ Range Having Maximally Crowded Geminal Methyl Groups," filed July 6, 1970 by Gary L. Driscoll, Irl N. Duling, David S. Gates and Robert W. Warren now U.S. Pat. No. 3,775,503 issued Nov. 27, 1973; the disclosures of which are hereby incorporated by reference.

BACKGROUND OF THE INVENTION

In the past traction transmission utilizing rolling traction surfaces have found only limited use due to the lack of a fluid to lubricate such surfaces while still maintaining an adequate coefficient or traction. Recently, several fluids have been discovered which have an adequate coefficient of traction but which have a lower viscosity index than is desired. In the past polymers of isobutene and other oils have been produced using catalyst systems based on aluminum chloride and boron trifluoride. These systems are severe in nature and produce oils having a nearly continuous spectrum of numbers of carbon atoms and isomeric structures. In general, and apparently due to this wide spectrum of isomeric structures in the various individual oil molecules, these processes produce oils having a relatively low viscosity index. For instance in the case of isobutene these processes are unable to produce an oil in the $C_{24}$–$C_{40}$ range having a viscosity index above 85. For many applications, including the use of these oils as a traction fluid or traction fluid component, a high viscosity index is desirable due to the variety of temperature which may be encountered.

SUMMARY OF THE INVENTION

The oils prepared from the various olefin monomers in accordance with the present invention vary considerably in their viscosity indices, but in each case have a higher viscosity index than oils prepared from the same olefin by prior art techniques. In accordance with the present invention polyisobutene oils having a viscosity index in the range of 90 to 130 and preferably from 95 to 130 can be prepared directly without blending and which oils predominates in the 24–40 carbon atom range. This property of these oils is more fully discussed in U.S. application Ser. No. 52,300, entitled "Branched Hydrocarbons in the $C_{16}$–$C_{40}$ Range Having Maximally Crowded Geminal Groups," filed July 6, 1970 by Gary L. Driscoll, Irl N. Duling, David S. Gates and Robert W. Warren. As used herein viscosity index refers to Viscosity Temperature Funciton Viscosity Index (VFT–VI) as determined by the technique of W. A. Wright as set forth in ASTM Bulletin #215, *84*, (1956). This value is similar to that obtained by ASTM D–2270 which is reported herein as ASTM–VI.

DESCRIPTION OF THE INVENTION

The present invention relates to the proper selection of solvent and catalyst which produces an oligomer of the olefin starting material with a minimum of the disproportionation and isomerization as found in the prior art processes. The solvent serves as a polar solvent to solvate the intermediate carbonium ions formed during the reaction, and to complex the catalyst to give a catalytically active species which remains in the solvent phase. The nitromethane and nitroethane or mixtures thereof together or with nitropropane as used herein also dissolve appreciable amounts of monomer but little of the oils. This last property is believed to be partly responsible for the narrow molecular weight distribution obtained in the product when using these preferred solvents which results in a more favorable product distribution. Of these nitromethane is the especially preferred solvent.

Monomers suitable for use in the present invention have the formula $$CH_2=\underset{R'}{\overset{R}{C}}$$

wherein —R is selected from the class consisting of —$CH_3$ and —$C_2H_5$, and R' is an alkyl group of from 1 to 10 carbon atoms.

The catalyst used in the present process is stannic chloride. The stronger Lewis acid catalysts such as aluminum chloride, aluminum bromide, titanium tetrachloride and antimony pentachloride do not cause any appreciable polymerization of the monomers in nitromethane. Boron trifluoride in nitromethane gives an oil product from isobutene having a viscosity index of about 75. Stannic chloride does not catalyze the polymerization of these monomers satisfactorily in such solvents as ether, water, dioxane, acetic acid, acetone, acetonitrile, acetic anhydride, diethylene glycol monoethyl ether, chloroform, methylacetate, dimethoxyethane, N-methylpyrrolidone, and hexamethylphosphoramide. Normally available nitro compounds (which are used as solvents herein) contain about 500 p.p.m. (parts per million) of water which cannot all be readily removed by conventional means due to the chemical nature of these nitro compounds. When the amount of water in the solvent is reduced to about 100 p.p.m. a slowing of the reaction is observed. When an additional amount of a proton donor is added to a reaction medium containing a reduced amount of water (100 p.p.m. or less) the reaction rate increases. Suitable proton donors, in addition to water, include organic acids such as acetic acid, mineral acids such as hydrochloric acid and alcohols such as methanol. The optimum amount of proton donor is about one mole of proton donor per mole of stannic chloride. As additional amounts of proton donor above equimolar are included in the reaction system the reaction gradually slows down. The given level 100–500 p.p.m. approximately represents azeotropic drying plus normal handling. Considerably higher levels of moisture content will be present upon extended standing exposed to the atmosphere.

In general the temperature can be varied from −30° C. to +100° C. with from −30° C. to 50° C. being the preferred range and −10° C. to 35° C. being an especially preferred range. The volume of oil prepared is generally at least equal to the volume of solvent for a given run but the ratio of volume of oil prepared to volume of solvent present may easily exceed 10:1. When carrying out the present invention in a continuous operation by continuously removing the reaction medium and separating the product from the catalyst and solvent; the ratio of solvent to product generally is maintained at from 2:1 to 1:2.

The catalyst may be used in an amount equal to from 0.1 to 5.0 volume percent of the solvent present, and preferably from 0.3 to 3.0 volume percent of the solvent present.

The reaction is extremely fast and by properly controlling the amount of solvent and proton donor reaction rates of 200 ml. of oil produced per hour per gram of tin present can be obtained. Generally the reaction rate will be greater than 50 ml. of oil per hour per gram of tin present.

The concentration of the free monomer in the reaction medium is relatively small and can be controlled by the pressure maintained at a given temperature for gaseous feeds and by rate of addition for liquid olefin feeds thus controlling the molecular weight of the product. Generally pressures of from about 1 to 275 p.s.i.a. have been found most suitable with from 10 to 100 p.s.i.a. being the preferred range.

Substantially quantitative conversions of monomer to the various telomers are obtained under appropriate combinations of conditions. Yields of 300 to 500 ml. of oil per gram of catalyst are readily attainable. The feedstock can vary from 5 to 100% monomer, the remainder being any inert hydrocarbons. The presence of hydrocarbon non-vinylidene compounds, such as pentane or n-butene, is not detrimental since the vinylidene monomers as defined herein are selectively polymerized by the catalyst system. For instance the efficiency of isobutene removal from mixtures of isobutene and other butenes and/or butanes depends on the particular conditions being used, but can be at least 80%. The present process is relatively insensitive to small amounts of impurities such as air, organo-sulfur or organo-nitrogen compounds.

The oils produced by the present invention may have a number average molecular weight of from 224 to about 2000. The preferred product contains principally the tetramer to decamer range. The tetramer in the present case consists predominantly of a major and a minor component. In the case of isobutene the hydrogenated major tetramer component has the structure:

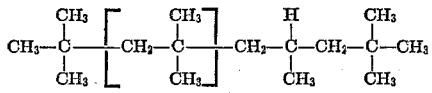

and the minor component has the structure:

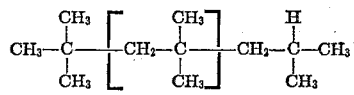

This latter type of structure predominates above the tetramer, i.e. at pentamer and above. The repeating unit for components of the pentamer and higher oligomers is indicated by the brackets in the formulae. The higher olefins such as 2-methylbutene-1 produce the corresponding regular structures when oligomerized in accordance with the present invention.

These oligomers are useful in the as produced unsaturated forms as electrical oils. When the oils are to be used as traction fluids they may be hydrogenated using a conventional hydrogenation catalyst such as Raney nickel, platinum, palladium or rhodium to improve the oxidative stability thereof. However, the olefinic oils are relatively stable and do not require further treatment in order for them to be suitable for use as traction fluids. For most uses such as traction fluid the higher molecular weight product may be left with the tetramer to decamer range material, but the dimers and trimers should be separated therefrom along with the monomer. This is readily accomplished by distillation.

The oils as produced by the present invention find particular advantage in their use as traction fluids due to their high coefficients of traction and excellent viscosity-temperature properties. The requirements of a traction fluid are discussed in the following U.S. patents:

| Patentee | Patent No. | Issue date |
|---|---|---|
| H. R. Kremmerer | 2,549,377 | Apr. 17, 1951 |
| W. C. Hammann et al | 3,411,369 | Nov. 19, 1968 |
| W. C. Hammann et al | 3,440,894 | Apr. 29, 1969 |

Exemplary tractive devices in which the traction fluids of the present invention find use are disclosed in the following U.S. patents:

| Patentee | Patent No. | Issue date |
|---|---|---|
| A. W. Gardiner et al | 1,867,553 | July 19, 1932 |
| Z. V. Weisel | 2,871,714 | Feb. 3, 1959 |
| O. K. Kelley et al | 3,006,206 | Oct. 31, 1961 |
| F. G. de Brie Perry | 3,184,990 | May 25, 1965 |

When the reaction is run at about 30° C. the product oil contains about 200 p.p.m. of tin which provides detectable antiwear properties. When the reaction temperature is reduced to 23½° C. the product oil contains between 800 and 1000 p.p.m. of tin which is sufficient to provide adequate antiwear properties when tested in a standard four-ball wear tester. When the reaction temperature is reduced to a range of 0° C. to 10° C. the product oil contains from 3 to 4% tin and the product oil becomes useful by itself as an antiwear additive for use in petroleum oils. At this reaction temperature the molecular weight of the product oil is about 1000. When the temperature of the reaction is reduced much below −10° C. the molecular weight of the product oil goes up to about 2000 which is higher than generally desired for use as an antiwear additive in petroleum oils. It is not known just what form the tin is in in these products but it stays in solution when the oils are used as additives in petroleum oils. The products are believed to contain carbon-tin bonds or carbon-oxygen-tin bonds.

Additionally these oils find use in caulks and as reactants, electrical oils, etc.

DESCRIPTION

Example I

Nitromethane (200 ml.) and $SnCl_4$ (5 ml.) are stirred in a three-necked, round bottom flask (500 ml.) equipped with a gas inlet tube, mechanical stirrer, reflux condenser, external bath and thermometer, while isobutene is passed into the mixture kept at 35° C. The isobutene is fed to the flask at a rate sufficient to maintain no flow on the outlet side after air has been swept from the flask. After 26 minutes the isobutene flow was stopped and the contents of the flask transferred to a separatory funnel. Conversion of the isobutene was quantitative. After allowing five minutes for phase separation, the nitromethane layer (202 ml.) is drained from the bottom of the funnel. In accordance with standard practice the oil layer (235 ml.) is washed twice with saturated aqueous sodium chloride solution, once with 5% aqueous sodium hydroxide solution and twice more with saturated aqueous sodium chloride solution. The oil layer is then dried over anhydrous calcium chloride and placed in a vacuum distillation apparatus. It is distilled to remove all material boiling below 80° C. at 0.5 mm. Hg. The remaining oil fraction (100 ml.) has the following properties:*
$KV_{210° F.}=425$ cs., $KV_{100° F.}=22.42$ cs., $VTF-VI=98$, $ASTM-VI=104$. The distillate (100 ml.) was approximately (by VPC) 49% trimer and 49% tetramer. Any dimer would have been lost to the trap (10 ml.). The loss on batch drying is about 30 ml.

Example II

Example I was repeated except that the oil was distilled, collecting as the oil fraction the portion boiling from 80–200° C. This had the following properties: $KV_{210° F.}=3.23$ cs., $KV_{100° F.}=14.09$ cs., $VTF-VI=105$, $ASTM-VI=104$. This illustrates that the high viscosity index of the product is not due to a wide blending range of product molecular weight.

Example III

A polymerization is carried out as in Example I except that the reaction temperature is maintained at 25° C. Again, 235 ml. of product is obtained in 26 minutes. The distillation gives 33 ml. of low boiling distillate (40% trimer, 57% tetramer) and 188 ml. of remaining oil. This oil is percolated through about 12 inches of a column packed with acid washed alumina. The resulting oil is completely clear and has the following properties:
$KV_{210° F.}=13.56$ cs., $KV_{100° F.}=145.2$ cs., $VTF-VI=96$, $ASTM-VI=96$.

Example IV

A polymerization is carried out as in Example I except that the feed is a mixed butane-butene stream. The major components of the stream are isobutane (38%), isobutene (9.5%), butene-1 (8%), cis and trans butene-2 (20%). The mixed gas feed (630% g.) is added and after work up 36 g. of product oil is obtained. This has $KV_{210° F.}=2.30$ cs., $KV_{100° F.}=8.12$ cs., and $VTF-VI=110$, $ASTM-VI=106$. This oil is a distillate fraction boiling at 80–200° C. at 0.25 mm. Hg pressure. A sample of the reactor off-gas analyzed as isobutane (45%), isobutene (2.4%), butene-1 (11%), cis and trans butene-2 (19%). This indicates about 80% removal of isobutene in one pass with little or no change in the other isomers.

Example V

Nitroethane (200 ml.) and stannic chloride (5 ml.) are stirred in a 1000 ml., three-necked, round bottom glass flask equipped with a gas inlet tube, mechanical stirrer, reflux condenser, external bath and thermometer while isobutene is passed into the mixture kept at 35° C. The isobutene is fed to the flask at a rate sufficient to maintain no flow on the outlet side after air has been removed from the flask. After 87 minutes the isobutene flow is stopped and the contents of the flask transferred to a separatory funnel. After allowing five minutes for phase separation the nitroethane layer is drained from the bottom of the funnel. The oil layer (770 ml.) is washed twice with saturated aqueous sodium chloride solution, once with 5% aqueous sodium hydroxide solution and twice more with saturated aqueous sodium chloride solution. The oil layer is then dried over anhydrous calcium chloride and placed in a vacuum distillation apparatus. It is distilled to remove all the material boiling below 80° C. at 1 mm. Hg. The remaining oil fraction (530 ml.) has the following properties:

$KV_{210° F.}=6.90$ cs., $KV_{100° F.}=49.34$ cs., $VTF-VI=95$, $ASTM-VI=104$.

Example VI

Nitromethane (100 ml.), 2-nitropropane (100 ml.) and stannic chloride (5 ml.) are stirred in a 1000 ml., three-necked, round bottom glass flask equipped with a gas inlet tube, mechanical stirrer, reflux condenser, external bath and thermometer, while isobutene is passed into the mixture kept at 35° C. The isobutene is fed to the flask at a rate sufficient to maintain no flow on the outlet side after air has been removed from the flask. After 60 minutes the isobutene flow is stopped and the contents of the flask transferred to a separatory funnel. After allowing five minutes for phase separation, the nitromethane-nitropropane layer is drained from the bottom of the funnel. The oil layer (520 ml.) is washed twice with saturated aqueous sodium chloride solution, once with 5% aqueous sodium hydroxide and twice more with saturated aqueous sodium chloride solution. The oil layer is then dried over anhydrous calcium chloride and placed in a vacuum distillation apparatus. It is distilled to remove all the material boiling below 80° C. at 1 mm. Hg. The remaining oil fraction (350 ml.) has the following properties:

$KV_{210° F.}=2.63$ cs., $KV_{100° F.}=10.0$ cs., $VTF-VI=100$, $ASTM-VI=108$.

Example VII

Toluene (200 ml.) and stannic chloride (5 ml.) are stirred in a 1000 ml., three-necked, round bottom glass flask equipped with a gas inlet tube, mechanical stirrer, reflux condenser, external bath and thermometer while isobutene is passed into the mixture kept at 65–70° C. The isobutene is fed to the flask at a rate sufficient to maintain no flow on the outlet side after air has been removed from the flask. After 21 minutes the isobutene flow is stopped. The product (365 ml.) is washed twice with saturated aqueous sodium chloride solution, once with 5% aqueous sodium hydroxide solution, and twice more with saturated aqueous sodium chloride solution. The other layer is then dried over anhydrous calcium chloride and placed in a vacuum distillation apparatus. It is distilled to remove all the material boiling below 80° C. at 1 mm. Hg including the toluene. The remaining oil fraction (53 ml.) has the following properties: $KV_{210° F.}=7.62$ cs., $KV_{100° F.}=58.50$ cs., $VTF-VI=94$, ---
*As used herein KV stands for Kinematic Viscosity as determined by ASTM D-445.

ASTM–VI=102. Infrared analysis showed no detectable amounts of aromatic compounds in the oil.

Example VIII

Benzene (200 ml.) and stannic chloride (5 ml.) are stirred in a 1000 ml., three-necked, round bottom glass flask equipped with a gas inlet tube, mechanical stirrer, reflux condenser, external bath and thermometer while isobutene is passed into the mixture kept at 60° C. The isobutene is fed to the flask at a rate sufficient to maintain no flow on the outlet side after air has been removed from the flask. After 39 minutes the isobutene flow is stopped and the contents of the flask transferred to a separatory funnel. The product (525 ml.) is washed twice with saturated aqueous sodium chloride solution, once with 5% aqueous sodium hydroxide solution, and twice more with saturated aqueous sodium chloride solution. The organic layer is then dried over anhydrous calcium chloride and placed in a vacuum distillation apparatus. It is distilled to remove all the material boiling below 80° C. at 1 mm. Hg including the benzene. The remaining oil fraction (205 ml.) has the following properties: $KV_{210° F.}=64.62$ cs., $KV_{100° F.}=1312$ cs., VTF–VI=114. Infrared analysis showed no detectable amounts of aromatic compounds in the oil.

Example IX

Nitrobenzene (50 ml.), benzene (50 ml.) and stannic chloride (5 ml.) are placed in a 200 ml. glass pressure bottle equipped with a gas inlet tube, magnetic stirrer, reflux condenser, external bath and thermometer. The bottle is flushed with isobutene added continuously while the external bath is maintained at between 15° C. and 20° C. The reaction is run for 30 minutes after which time 194 ml. of product is obtained. The product is washed twice with water and once with 10% aqueous sodium carbonate solution. The product is then distilled to obtain three fractions, a light fraction, a fraction boiling at from 80° C. to 190° C. at 1.0 mm. Hg and a heavy bottoms fraction (39 ml.). The bottoms fraction has the following properties: $KV_{210° F.}=56.69$ cs., $KV_{100° F.}=1100$ cs., ASTM–VI=109, VTF–VI=113. An infrared spectrum shows that the aromatics content of this heavy bottoms fraction is less than 1% (none detectable).

Example X

A 500 ml. round bottom, three-necked, glass flask is equipped with a dropping funnel, a mechanical stirrer, and a reflux condenser with a thermometer. Nitromethane (50 ml.) and stannic chloride (5 ml.) are placed in the flask and the entire flask is cooled between —20° C. to —30° C., and 100 ml. of 2-methyl-1-butene is added dropwise from the dropping funnel. The mixture is stirred for 90 minutes while the temperature is maintained between —5° C. and —10° C. The layers which have formed are separated and the oil (top) layer is washed twice with about 200 ml. of water each time. The oil is dried over anhydrous calcium chloride and distilled under vacuum. A lower boiling fraction (17 ml. B.P. 50–78° C. at 0.5 mm. Hg) is collected. The desired oil is the residue (30 ml. B.P. 78–200° C. at 0.5 mm. Hg). This oil has the following properties: $KV_{210° F.}=4.66$ cs., $KV_{100° F.}=32.16$ cs., VTF–VI=52, ASTM–VI=44.

Example XI

Example X is repeated except that 100 ml. of 2-methyl-1-pentene is used instead of 100 ml. of 2-methyl-1-butene. After distillation of the product oil to 80° C. at 1 mm. Hg the residue is 47 ml. of oil having the following properties: $KV_{210° F.}=3.02$ cs., $KV_{100° F.}=16.26$ cs., VTF–VI=26, ASTM–VI=8.

Example XII

A 4 liter glass open top cylinder exposed to the atmosphere is charged with 2.5 liters of nitromethane containing 1 volume percent stannic chloride and 2 drops of water. Isobutene is fed to the bottom of the cylinder by means of a tube. The reaction begins in a few minutes. The rate of isobutene feed is controlled so as to produce 3 liters of oil per hour. The polyisobutene oil forms as a separate layer on top of the nitromethane. The polyisobutene oil is continuously removed from the top of the cylinder. As removed from the cylinder the polyisobutene oil is a mixture each 10 ml. of which contains 9 ml. of polyisobutene oil and 1 ml. of nitromethane. The polyisobutene oil contains 300 p.p.m. of tin. The mixture of oil and nitromethane which is removed from the cylinder is placed in a large separatory funnel and allowed to settle at ambient temperature for 4 hours after which the denser nitromethane is drained from the bottom of the funnel. At this point the polyisobutene oil contains approximately 0.5 volume percent nitromethane which is separated from the oil when the oil is distilled into the various fractions desired. For each liter of product removed 10 ml. of nitromethane and 1 ml. of stannic chloride are added to the cylinder. The isobutene is fed to the cylinder during regular workdays for approximately eight hours per day and shut down each night over a period of a month. At the end of this time a sample of the nitromethane phase in the cylinder is analyzed and found to contain 0.92 weight percent tin. Thus there is 25 g. of tin present in the cylinder and the oil is being produced at a rate of 120 ml. per hour per gram of tin present. The amount of isobutene fed to the cylinder and the amount of oil produced are compared periodically and the yield is found to range from 97 to 98%. The feed rate is varied occasionally and it is found that 6 liters of oil per hour can be produced without significant drop in yield. A representative sample of the oil produced at ambient temperature is found to contain substantially no dimer and roughly equal amounts of trimer, tetramer, etc. up to nonamer which is the highest oligomer which can be distilled without cracking (250° C. at 0.1 mm. Hg). The tetramer fraction has a final distillation temperature of 288° C., a viscosity of 3.57 cs. (100° F.), 37.8 SUS 100° F., 1.36 cs. 210° F., and a VTF–VI of 118. The pentamer fraction has a final distillation temperature of 342° C. a viscosity of 9.03 cs. (100° F.), 55.5 SUS 100° F., 2.456 cs. 210° F., and a VTF–VI of 105. The hexamer has a viscosity of 21.01 cs. (100° F.), 101.7 SUS (100° F.), 4.09 cs. (210° F.) and a VTF–VI of 103. The heptamer has a final distillation temperature of 475° F., a viscosity of 56.7 cs. (100° F.), 262 SUS (100° F.), 7.38 cs. (210° F.) and a VTF–VI of 99. The octamer has a final distillation temperature of 435° F., a viscosity of 134 cs. (100° F.), 621 SUS (100° F.), 12.44 cs. (210° F.) and a VTF–VI of 90.

The invention claimed is:

1. A process for producing oils by contacting isobutene with a solution of from 0.1 to 5 volume percent as based on the solvent of stannic chloride in a solvent selected from the class consisting of nitromethane, nitroethane or mixtures thereof together or with nitropropane, and a minor amount of a proton donor present in an amount equal to at least about 100 p.p.m. of the catalyst solution at from —30° C. to +100° C. whereby an oil product containing principally isobutene tetramer to isobutene decamer is produced.

2. The process of Claim 1 wherein the solvent is nitromethane.

3. The process of Claim 2 wherein the pressure is maintained at from about 1 to 275 pounds per square inch absolute.

4. The process of Claim 3 wherein the temperature is from —10° C. to +35° C.

5. The process of Claim 4 wherein the oil is produced at a rate greater than 50 ml. of oil per hour per gram of tin present.

6. The process of Claim 5 wherein the stannic chloride is present in from 0.3 to 3 volume percent as based on the nitromethane.

7. The process of Claim 1 wherein the pressure is maintained at from about 1 to 275 pounds per square inch absolute.

8. The process of Claim 7 wherein the temperature is from $-10°$ C. to $+35°$ C.

9. The process of Claim 8 wherein the oil is produced at a rate greater than 50 ml. of oil per hour per gram of tin present.

10. The process of Claim 9 wherein the stannic chloride is present in from 0.3 to 3 volume percent as based on the solvent present.

References Cited
UNITED STATES PATENTS

| | | | |
|---|---|---|---|
| 2,403,779 | 7/1946 | Bailey | 260—683.15 |
| 2,085,535 | 6/1937 | Langedijk et al. | 260—683.15 |
| 2,076,201 | 4/1937 | Langedijk et al. | 260—683.15 |

PAUL M. COUGHLAN, Jr., Primary Examiner

U.S. Cl. X.R.

252—59